US009359494B2

(12) United States Patent
McLeod et al.

(10) Patent No.: US 9,359,494 B2
(45) Date of Patent: *Jun. 7, 2016

(54) METHODS FOR IMPROVING MULTIMODAL POLYETHYLENE AND FILMS PRODUCED THEREFROM

(71) Applicant: FINA TECHNOLOGY, INC., Houston, TX (US)

(72) Inventors: Michael McLeod, Kemah, TX (US); Marco Araya, League City, TX (US); Ruby L. Curtis, League City, TX (US); John Ashbaugh, Houston, TX (US); Leonardo Cortes, League City, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/630,798

(22) Filed: Feb. 25, 2015

(65) Prior Publication Data
US 2015/0166775 A1 Jun. 18, 2015

Related U.S. Application Data

(63) Continuation of application No. 13/965,783, filed on Aug. 13, 2013, which is a continuation of application No. 13/676,893, filed on Nov. 14, 2012, now Pat. No. 8,580,893.

(60) Provisional application No. 61/578,987, filed on Dec. 22, 2011.

(51) Int. Cl.
C08L 23/06 (2006.01)

(52) U.S. Cl.
CPC ........... C08L 23/06 (2013.01); C08L 2203/162 (2013.01); C08L 2205/025 (2013.01); C08L 2207/062 (2013.01)

(58) Field of Classification Search
CPC ... A61L 31/041; A61L 31/143; A61L 31/148; A61L 31/06; C08J 3/28; C08J 2367/04; B29D 23/20; A61F 2/82; B29C 47/0076; B29C 2031/753; B29C 2023/20; C08C 67/04; B29K 2005/00
See application file for complete search history.

(56) References Cited

U.S. PATENT DOCUMENTS

| | | |
|---|---|---|
| 4,271,060 A | 6/1981 | Hubby |
| 4,543,399 A | 9/1985 | Jenkins, III et al. |
| 4,588,790 A | 5/1986 | Jenkins, III et al. |
| 5,001,205 A | 3/1991 | Hoel |
| 5,028,670 A | 7/1991 | Chinh et al. |
| 5,236,998 A | 8/1993 | Lundeen et al. |
| 5,317,036 A | 5/1994 | Brady, III et al. |
| 5,352,749 A | 10/1994 | DeChellis et al. |
| 5,405,922 A | 4/1995 | DeChellis et al. |
| 5,436,304 A | 7/1995 | Griffin et al. |
| 5,456,471 A | 10/1995 | MacDonald |
| 5,462,999 A | 10/1995 | Griffin et al. |
| 5,525,678 A | 6/1996 | Mink et al. |
| 5,530,055 A * | 6/1996 | Needham ................ C08L 23/04 264/310 |
| 5,589,555 A | 12/1996 | Zboril et al. |
| 5,616,661 A | 4/1997 | Eisinger et al. |
| 5,627,242 A | 5/1997 | Jacobsen et al. |
| 5,665,818 A | 9/1997 | Tilston et al. |
| 5,668,228 A | 9/1997 | Chinh et al. |
| 5,677,375 A | 10/1997 | Rifi et al. |
| 6,147,173 A | 11/2000 | Holtcamp |
| 6,180,735 B1 | 1/2001 | Wenzel |
| 6,207,606 B1 | 3/2001 | Lue et al. |
| 6,211,105 B1 | 4/2001 | Holtcamp |
| 6,242,545 B1 | 6/2001 | Jejelowo et al. |
| 6,245,705 B1 | 6/2001 | Kissin |
| 6,245,868 B1 | 6/2001 | Agapiou et al. |
| 6,248,845 B1 | 6/2001 | Loveday et al. |
| 6,271,323 B1 | 8/2001 | Loveday et al. |
| 6,274,684 B1 | 8/2001 | Loveday et al. |
| 6,300,436 B1 | 10/2001 | Agapiou et al. |
| 6,339,134 B1 | 1/2002 | Crowther et al. |
| 6,340,730 B1 | 1/2002 | Murray et al. |
| 6,346,586 B1 | 2/2002 | Agapiou et al. |
| 6,359,072 B1 | 3/2002 | Whaley |
| 6,380,328 B1 | 4/2002 | McConville et al. |
| 6,420,580 B1 | 7/2002 | Holtcamp et al. |
| 6,599,971 B2 | 7/2003 | Dotson et al. |
| 6,794,433 B2 | 9/2004 | Dotson et al. |
| 6,969,741 B2 * | 11/2005 | Lustiger et al. ..... C08L 23/0815 264/310 |
| 7,309,741 B2 * | 12/2007 | Kazakov et al. ........ C08L 23/04 525/240 |
| 7,332,536 B2 | 2/2008 | Dotson et al. |
| 7,396,892 B2 | 7/2008 | McGrath |
| 7,473,745 B2 | 1/2009 | Chandrashekar et al. |
| 8,580,893 B2 * | 11/2013 | McLeod et al. ......... C08L 23/06 524/515 |

(Continued)

FOREIGN PATENT DOCUMENTS

WO 2005/103132 † 11/2005

OTHER PUBLICATIONS

International Preliminary Report on Patentability issued in International Application No. PCT/US2012/070338, dated May 14, 2015 (8 pages).

International Search Report issued in International Application No. PCT/US2012/070338, dated Feb. 26, 2013 (2 pages).

Primary Examiner — Nathan M Nutter
(74) Attorney, Agent, or Firm — Albert Shung

(57) ABSTRACT

A blown film composition including a first high density polyethylene component and a second high density polyethylene component, wherein the blown film contains a mixture of three or more discrete molecular weight distributions, and wherein the second high density polyethylene component has at least one more discrete molecular weight distribution than the first high density polyethylene component.

27 Claims, 5 Drawing Sheets

(56) References Cited

U.S. PATENT DOCUMENTS

| | | |
|---|---|---|
| 2004/0030066 A1 | 2/2004 | Loveday et al. |
| 2006/0047078 A1 | 3/2006 | Swabey et al. |
| 2007/0043182 A1 | 2/2007 | Martin et al. |
| 2008/0004411 A1 | 1/2008 | Sukhadia et al. |
| 2008/0057238 A1 | 3/2008 | Follestad et al. |
| 2008/0118749 A1 | 5/2008 | Aubee et al. |
| 2008/0269421 A1 | 10/2008 | Nilsen et al. |
| 2009/0029182 A1 | 1/2009 | Aubee et al. |
| 2009/0253863 A1 | 10/2009 | Nord-Varhaug et al. |
| 2010/0099824 A1 | 4/2010 | Helland et al. |

\* cited by examiner
† cited by third party

METHODS FOR IMPROVING MULTIMODAL POLYETHYLENE AND FILMS PRODUCED THEREFROM

CROSS-REFERENCE TO RELATED APPLICATIONS

This application is a continuation of U.S. patent application Ser. No. 13/965,783, filed on Aug. 13, 2013, which is a continuation of U.S. patent application Ser. No. 13/676,893, filed on Nov. 14, 2012, now issued as U.S. Pat. No. 8,580,893, which claims priority from U.S. Provisional Patent Application No. 61/578,987, filed on Dec. 22, 2011.

FIELD

The present disclosure is generally related to polyolefins and methods of making polyolefins. More specifically, the present disclosure is related to methods of making improved polyethylene films.

BACKGROUND

A polyolefin is a polymer produced from a simple olefin monomer, or alkene with the general formula $C_nH_{2n}$. Polyolefins may be used in blown films. An example of a polyolefin is polyethylene, which is produced by polymerizing the olefin ethylene. One type of polyethylene is high density polyethylene, or HDPE. HDPE is defined by having a density of greater or equal to 0.941 $g/cm^3$. HDPE is commonly used in a wide array of products and packaging including products such as milk jugs, laundry detergent bottles, plastic bags, garbage containers and toys. HDPE blown films may include HDPE barrier films having moisture barrier and/or vapor barrier properties.

Multiple challenges exist in producing HDPE barrier films. For example, obtaining a desired melt strength can be a difficulty with narrow molecular weight resins, resins that lack long chain branching, and resins with high melt indices. Various methods have been tried to improve these properties of barrier films.

SUMMARY

An embodiment of the present disclosure, either by itself or in combination with other embodiments, is a blown film composition that includes a first high density polyethylene component, a second high density polyethylene component and a nucleating agent, where the blown film composition is a combination of three or more discrete molecular weight distributions. The first high density polyethylene component can be unimodal, have a density ranging from 0.950 to 0.970 $g/cm^3$ and a melt flow index (MFI) ranging from 0.5 to 5.0 g/10 min and can be in amounts ranging from 60 to 99 wt % based on the total weight of the blown film composition. The second high density polyethylene component can be bimodal, have a density ranging from 0.945 to 0.970 $g/cm^3$ and a MFI ranging from 0.1 to 5.0 g/10 min.

The blown film composition can have a water vapor transmission rate (WVTR) at 2 mil of less than 0.130 $g/100 in^2/day$ at maximum frost line height. The WVTR at 2 mil can be less than the WVTR of either the first or second high density polyethylene component absent the polyethylene compatible nucleating agent The blown film composition can have a decrease in haze of at least 10% and an increase in gloss of at least 10% over an identical blown film composition absent the polyethylene compatible nucleating agent. Optionally the blown film composition can have a decrease in haze of at least 20% and an increase in gloss of at least 40% at maximum frost line height over an identical blown film composition absent the polyethylene compatible nucleating agent.

An embodiment of the disclosure can include an article made from the blown film composition.

An alternate embodiment, either by itself or in combination with other embodiments, is a multimodal blend of a first high density polyethylene component, a second high density polyethylene component and a polyethylene compatible nucleating agent where the blend is a mixture of three or more discrete molecular weight distributions. The weight ratio of the first high density polyethylene component to the second high density polyethylene component in the multimodal blend can be from 25:1 to 3:1. The multimodal blend when blown to a film with maximum stable frost line height can have a WVTR of less than 0.250 $g/100 in^2/day$. The first high density polyethylene component can be unimodal and the second high density polyethylene component can be bimodal. The blend can have a decrease in haze of at least 10% and an increase in gloss of at least 10% over an identical blend absent the polyethylene compatible nucleating agent. An embodiment of the disclosure can include an article made from the blown film composition.

An alternate embodiment is a method of making a multimodal film that includes combining a first high density polyethylene component, a second high density polyethylene component, and a polyethylene compatible nucleating agent, to form a multimodal resin having three or more discrete molecular weight distributions. The second high density polyethylene component has at least one more discrete molecular weight distribution than the first high density polyethylene component.

Other possible embodiments include two or more of the above embodiments of the disclosure. In an embodiment the method includes all of the above embodiments and the various procedures can be carried out in any order.

BRIEF DESCRIPTION OF DRAWINGS

The present disclosure is best understood from the following detailed description when read with the accompanying figures.

DETAILED DESCRIPTION

Figure 1:
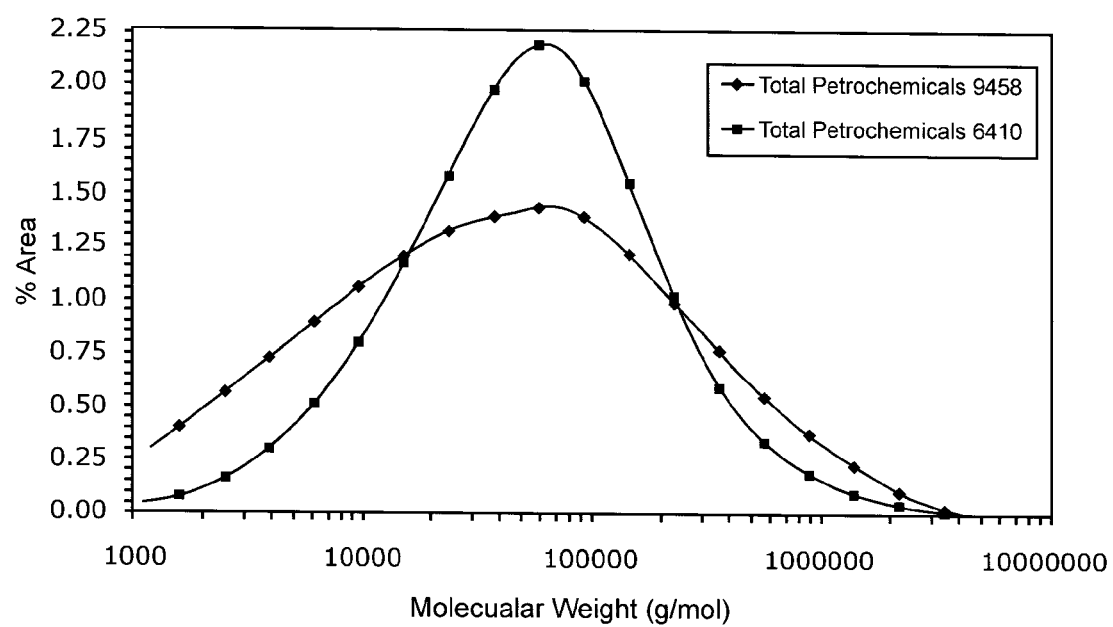
FIG. 1 is a graph of a molecular weight distribution of two polyethylene components of an embodiment of a multimodal blend.

The following disclosure provides many different embodiments, or examples, for implementing different features of various embodiments. Specific examples of components and arrangements are described below to simplify the present disclosure. These are, of course, merely examples and are not intended to be limiting.

Disclosed herein are nucleators that are effective in a multimodal polyethylene blend. Also disclosed herein is a nucleated multimodal polyethylene blend having improved barrier properties over a non-nucleated multimodal polyethylene blend. Further disclosed is a nucleated multimodal blend having a lower haze and a higher gloss when compared to a non-nucleated blend, wherein frost height is maximized. Further disclosed herein are methods of making a nucleated multimodal polyethylene blend.

The catalyst systems that may be useful in polymerizing olefin monomers include any suitable catalyst system. The catalysts used in conjunction with the present disclosure may include for example, chromium based catalyst systems, single site transition metal catalyst systems including metallocene catalyst systems, Ziegler-Natta catalyst systems or combinations thereof. The polymerization catalysts may be activated and may or may not be associated with a support material. The following discussion of such catalyst systems included below is in no way intended to limit the scope of the present disclosure to such catalysts.

Ziegler-Natta catalyst systems may be formed from the combination of a metal component (e.g., a catalyst) with one or more additional components, such as a catalyst support, a cocatalyst and/or one or more electron donors. In some embodiments, the Ziegler-Natta catalyst systems include magnesium-supported catalyst systems. In an embodiment, for example, a magnesium-supported Ziegler-Natta catalyst may be prepared by the steps of: preparing a metal dialkoxide as the reaction product of a metal dialkyl and an alcohol; followed by preparing a soluble catalyst precursor as the reaction product of the metal dialkoxide and a halogenating/titanating agent; and lastly followed by precipitating of a final solid catalyst component as the reaction product of the soluble catalyst precursor and a precipitating agent. The precipitating agent may also be used as a halogenating/titanating agent. The process of preparing the Ziegler-Natta catalyst may include further steps, such as additional halogenating/titanating steps.

The metal dialkyls may include Group IIA metal dialkyls. In a specific embodiment, the metal dialkyl is a magnesium dialkyl. The magnesium dialkyl may be selected from the group of diethyl magnesium, dipropyl magnesium, dibutyl magnesium, and butylethyl magnesium (BEM) and combinations thereof.

Metallocenes may include organometallic compounds containing two cyclopentadienyl rings bonded to a metal atom. Metallocene catalysts generally include a transition metal situated between to organic rings. Metallocene catalysts are homogenous (soluble in hydrocarbons), whereas Ziegler-Natta catalysts are heterogeneous. Metallocene catalysts may be characterized as coordination compounds incorporating one or more cyclopentadienyl (Cp) groups (which may be substituted or unsubstituted, each substitution being the same or different) coordinated with a transition metal through IC bonding. The substituent groups on the Cp groups may be linear, branched or cyclic hydrocarbyl radicals. The cyclic hydrocarbyl radicals may further form other contiguous ring structures, including, but not limited to, indenyl, azulenyl and fluorenyl groups. These contiguous ring structures may further substituted or unsubstituted by hydrocarbyl radicals, such as $C_1$ to $C_{20}$ hydrocarbyl radicals.

Any desired polymerization process(es) may be carried out over the desired polymerization catalyst(s). The equipment, process conditions, reactants, additives and any other materials that may be used in the polymerization process(es) can vary depending on the desired composition and properties of the polymer being formed. The polymerization processes may include solution phase, gas phase, slurry phase, bulk phase, high pressure processes or any combinations thereof. (See, U.S. Pat. No. 4,271,060, U.S. Pat. No. 5,001,205, U.S. Pat. No. 5,236,998 and U.S. Pat. No. 5,525,678, U.S. Pat. No. 5,589,555; U.S. Pat. No. 6,420,580; U.S. Pat. No. 6,380,328; U.S. Pat. No. 6,359,072; U.S. Pat. No. 6,346,586; U.S. Pat. No. 6,340,730; U.S. Pat. No. 6,339,134; U.S. Pat. No. 6,300,436; U.S. Pat. No. 6,274,684; U.S. Pat. No. 6,271,323; U.S. Pat. No. 6,248,845; U.S. Pat. No. 6,245,868; U.S. Pat. No. 6,245,705; U.S. Pat. No. 6,242,545; U.S. Pat. No. 6,211,105; U.S. Pat. No. 6,207,606; U.S. Pat. No. 6,180,735 and U.S. Pat. No. 6,147,173, each of which are incorporated by reference herein in their entirety.)

Gas phase polymerization processes useful with the present disclosure may include a continuous cycle system. A continuous cycle system may include a cycling gas stream, which may include a recycle stream or other fluidizing medium, which is heated in a reactor by the heat of polymerization. The heat is then removed from the cycling gas stream by a cooling system external to the reactor. The cycling gas stream containing one or more monomers may be continuously cycled through a fluidized bed in the presence of a catalyst under reactive conditions. The cycling gas stream may be withdrawn from the fluidized bed and recycled back into the reactor. A polymer product may be simultaneously withdrawn from the reactor while fresh monomer may be added to replace the polymerized monomer (polymer product). The gas phase process may be operated under reactor pressures ranging from 100 to 500 psig, from 200 to 400 psig, or from 250 to 350 psig. The gas phase process may be operated under reaction temperatures ranging from 30 to 120° C., from 60 to 115° C., from 70 to 110° C., or from 70 to 95° C. (See, for example, U.S. Pat. No. 4,543,399; U.S. Pat. No. 4,588,790; U.S. Pat. No. 5,028,670; U.S. Pat. No. 5,317,036; U.S. Pat. No. 5,352,749; U.S. Pat. No. 5,405,922; U.S. Pat. No. 5,436,304; U.S. Pat. No. 5,456,471; U.S. Pat. No. 5,462,999; U.S. Pat. No. 5,616,661; U.S. Pat. No. 5,627,242; U.S. Pat. No. 5,665,818; U.S. Pat. No. 5,677,375 and U.S. Pat. No. 5,668,228, each of which are incorporated by reference herein in their entirety.)

Slurry phase processes may include forming a suspension of solid, particulate polymer in a liquid polymerization medium, and adding monomers, catalyst and optionally hydrogen to the medium. The suspension may be intermittently or continuously removed from the reactor. The removed suspension may then be subjected to separation step where the volatile components can be separated from the polymer and recycled to the reactor. The suspension may further include a diluent, such as a $C_3$ to $C_7$ alkane (e.g., hexane or isobutene), which is generally liquid under the conditions of polymerization and relatively inert. A bulk phase process is similar to that of a slurry process, except that in the bulk phase process the liquid medium is also the reactant (e.g., monomer). In an embodiment, the polymerization process may be a bulk process, a slurry process or a bulk slurry process.

In an embodiment, a slurry process or a bulk process may be carried out continuously in one or more loop reactors. The catalyst, as slurry or as a dry free flowing powder, may be injected intermittently or continuously into the reactor loop. In an alternative embodiment, hydrogen may be added to the process in order to aid in molecular weight control of the resultant polymer. The loop reactor may be operated under pressures ranging from 27 to 50 bar or from 35 to 45 bar and under temperatures ranging from 38 to 121° C. In an embodiment, reaction heat may be removed through the wall of the loop reactor by any suitable method, such as by a double-jacketed pipe or heat exchanger.

In an embodiment, the slurry polymerization process may be carried out in a stirred reactor, such as a continuously stirred tank reactor (CSTR). Other types of polymerization processes may be used, such as stirred reactors in series, parallel or combinations thereof. Upon leaving the reactor, the polymer may be subjected to further processing, such as addition of additives and/or extrusion.

The polymers, including blends thereof, formed via the processes described herein may include, but are not limited to, high density polyethylene (HDPE), medium density polyethylene (MDPE), low density polyethylene (LDPE), linear low density polyethylene (LLDPE), and very low density polyethylene (VLDPE) for example.

The blend of the present disclosure may include at least two ethylene-based polymeric components. In certain embodiments, the blend contains only ethylene-based polymeric components. In an embodiment, the blend of the present disclosure includes at least one ethylene homopolymer component. In another embodiment, the blend of the present disclosure includes at least one ethylene homopolymer and at least one other ethylene homopolymer or copolymer, and combinations and modifications thereof. In a further embodiment, the blend of the present disclosure is a multimodal polyethylene composition. In certain embodiments, the blend contains only a multi-modal polyethylene composition, i.e., no other polymeric components. As referred to herein, the term "multimodal" refers to a mixture of two or more discrete molecular weight distributions, or "modes".

In an embodiment, the multimodal composition includes at least two components. In an embodiment, the at least two components each include at least one discrete molecular weight distribution, or mode. In another embodiment, the at least two components of the multimodal composition include a first component and a second component. In an embodiment, the first component has at least one mode and the second component has at least two modes. In an embodiment, the second high density polyethylene component has at least one more discrete molecular weight distribution than the first high density polyethylene component. In a specific embodiment, the multimodal polyethylene composition includes a unimodal component and a bimodal component, resulting in a trimodal composition. In an embodiment either component may have more than one mode which when the components are combined yields a molecular weight distribution (MWD) of from 2.0 to 25.

The first component of the multimodal composition may include a polyethylene homopolymer. In an embodiment, the first component may have densities ranging from 0.880 to 0.970 g/cm$^3$, which encompasses what are referred to as low density, medium density and high density polyethylene. High density polyethylene (HDPE) typically has density ranging from 0.941 to 0.970 g/cm$^3$, medium density polyethylene (MDPE) has density ranging from 0.926 to 0.940 g/cm$^3$, linear low density polyethylene (LLDPE) has density ranging from 0.916 to 0.925 g/cm$^3$ and very low density polyethylene (VLDPE) resins typically have densities from 0.890 to 0.915 g/cm$^3$. In an embodiment, the density of the first component ranges from 0.950 to 0.970 g/cm$^3$, optionally from 0.960 to 0.965 g/cm$^3$, or optionally from 0.961 to 0.963 g/cm$^3$. The densities of the polyethylene components may be determined in accordance with ASTM D 792.

In an embodiment the first component of the multimodal composition may have a MFI of at least 0.1 g/10 min. In another embodiment, the first component has a MFI ranging from 0.1 to 5.0 g/10 min, optionally from 1.0 to 3.0 g/10 min, optionally from 1.5 to 2.5 g/10 min. The melt flow index of the polyethylene can be measured using the procedures of ASTM D 1238 at 190° C. using a load of 2.16 kg.

In an embodiment, the molecular weight of the first component ranges from 1,000 g/mol to 10,000,000 g/mol. In another embodiment, the molecular weight of the first component ranges from 3,000 g/mol to 500,000 g/mol, optionally from 10,000 to 200,000 g/mol, optionally from 30,000 to 100,000 g/mol. In an embodiment, the molecular weight distribution (MWD) of the first component ranges from 2 to 25, optionally 4 to 18, and optionally 5 to 12.

When measured on two mil films, the first component may possess an Elmendorf Tear strength (measured using the ASTM test method D 1922) in the machine direction (MD) ranging from 10 to 50 g, optionally 20 to 30 g, and optionally 22 to 26 g, and in the transverse direction (TD) ranging from 200 to 600 g, optionally 300 to 500 g, and optionally 375 to 400 g. The tensile strength (measured using the ASTM test method D 882A at 20 in/min) of the first component at yield may range from 1000 to 6000 psi, optionally 3000 to 5000 psi, and optionally 3500 to 4100 in the MD and may range from 1000 to 6000 psi, optionally 3000 to 5000, and optionally 3700 to 4300 in the TD and at break may range from 5000 to 10000, optionally from 6000 to 9000, and optionally from 7000 to 8000 in the MD and may range from 2000 to 5000, optionally 2500 to 4500, and optionally 3300 to 3500 in the TD. The elongation at break in both the MD and the TD (measured using ASTM test method D 882A at 20 in/min) of the first component may range from 100 to 1000%, optionally 400 to 900%, and optionally 600 to 800%. The secant modulus at 1% strain (measured using ASTM test method D 882A at 20 in/min) of the first component in the MD may range from 50 to 200 kpsi, optionally 100 to 150 kpsi, and optionally 120 to 130 kpsi and in the TD may range from 50 to 200 kpsi, optionally 100 to 150 kpsi, and optionally 124 to 132 kpsi. The secant modulus at 2% strain (measured using ASTM test method D 882A at 1 in/min) of the first component in the MD may range from 50 to 200 kpsi, optionally 75 to 125 kpsi, and optionally 95 to 105 kpsi and in the TD may range from 50 to 200 kpsi, optionally 75 to 125 kpsi, and optionally 98 to 106 kpsi.

The first component may possess a water vapor transmission rate (WVTR) (measured at 100° F. using ASTM test method E96/66) ranging from 0.01 to 0.5 g/100 in$^2$/day, optionally ranging from 0.1 to 0.4 g/100 in$^2$/day, and optionally ranging from 0.2 to 0.3 g/100 in$^2$/day. The first component may be for example, HDPE 6420, commercially available from Total Petrochemicals USA, Inc.

The second component of the multimodal composition may also include a polyethylene homopolymer, copolymer, and any combinations and modifications thereof. In an embodiment the second component may have densities ranging from 0.880 to 0.970 g/cm$^3$, which encompasses what are referred to as low density, medium density and high density polyethylene. In an embodiment, the density of the second component ranges from 0.940 to 0.970 g/cm$^3$, optionally from 0.950 to 0.965 g/cm$^3$, optionally from 0.952 to 0.962 g/cm$^3$, optionally from 0.956 to 0.960 g/cm$^3$. The densities of the polyethylene components may be determined in accordance with ASTM D 792.

In another embodiment the second component of the multimodal composition may have a melt flow index (MFI) ranging from 0.1 to 5.0 g/10 min. In another embodiment, the second component has a MFI ranging from 0.1 to 2.0 g/10 min. In an alternative embodiment, the second component has a MFI ranging from 0.2 to 1.0 g/10 min. In a further embodiment, the second component has a MFI ranging from 0.3 to 0.6 g/10 min. The melt flow index of the polyethylene second component is measured using the procedures of ASTM D 1238 at 190° C. using a load of 2.16 kg.

In an embodiment, the molecular weight of the second component ranges from 1,000 g/mol to 10,000,000 g/mol. In another embodiment, the molecular weight of the second component ranges from 1,000 g/mol to 1,000,000 g/mol. In a further embodiment, the molecular weight of the second component ranges from 2,000 to 300,000 g/mol. In an even further embodiment, the molecular weight of the second component ranges from 20,000 to 100,000 g/mol. In an embodiment, the molecular weight distribution (MWD) of the second component ranges from 2 to 25, optionally 4 to 18, and optionally 5 to 12.

The second component may posses a dart impact (measured using ASTM test method D 1709A) of less than 100 g, optionally less than 75 g, and optionally less than 50 g. Measured on two mil films, the second component may possess an Elmendorf Tear strength (measured using the ASTM test method D 1922) in the machine direction (MD) ranging from 1 to 30 g, optionally 10 to 20 g, and optionally 13 to 17 g, and in the transverse direction (TD) ranging from 100 to 10000 g, optionally 500 to 2000 g, and optionally 1000 to 1100 g. The tensile strength (measured using the ASTM test method D 882A at 20 in/min) of the second component at yield may range from 1000 to 6000 psi, optionally 3500 to 5500 psi, and optionally 4400 to 4600 in the MD and may range from 1000 to 4000 psi, optionally 2000 to 3000, and optionally 2500 to 2700 in the TD and at break may range from 5000 to 10000, optionally from 6000 to 9000, and optionally from 7500 to 8000 in the MD and may range from 1000 to 4000, optionally 2000 to 3000, and optionally 2500 to 2700 in the TD. The elongation at break (measured using ASTM test method D 882A at 20 in/min) of the second component may range from 100 to 500%, optionally 200 to 300%, and optionally 250 to 290% in the MD and may be less than 100%, optionally less than 50%, and optionally less than 10% in the TD. The secant modulus at 1% strain (measured using ASTM test method D 882A at 20 in/min) of the second component in the MD may range from 50 to 250 kpsi, optionally 125 to 175 kpsi, and optionally 150 to 155 kpsi and in the TD may range from 100 to 300 kpsi, optionally 150 to 250 kpsi, and optionally 195 to 205 kpsi.

The second component may possess a water vapor transmission rate (WVTR) (measured at 100° F. using ASTM test method E96/66) ranging from 0.1 to 2.0 g/100 in$^2$/day, optionally ranging from 0.3 to 1.0 g/100 in$^2$/day, and optionally ranging from 0.6 to 0.8 g/100 in$^2$/day. The second component may be for example, HDPE 9458, commercially available from Total Petrochemicals USA, Inc.

The multimodal polyethylene blend of the present disclosure may include a nucleated material. In an embodiment, the nucleated material is present in the first composition, the second composition or combinations thereof. In an embodiment, the nucleated material is obtained by the use of a nucleating agent. The nucleating agent refers to a foreign phase, or nucleation site, that when introduced into the material presents a new surface on which crystal growth can occur.

Nucleation of homophasic polymers may generally improve the optical properties, such as haze and clarity, of a polymer. However, nucleation of heterophasic polymers has not generally resulted in such improved optical properties.

The present disclosure, however, includes a polyethylene compatible nucleator. Polyethylene compatible nucleators may include a nucleator, or nucleating agent, capable of accelerating phase change in ethylene based polymers. The polyethylene compatible nucleator provides for polymer blends exhibiting significantly improved optical properties. In an embodiment, the polymer blends show a decrease in haze of at least about 10%, at least about 20% or at least about 30% over identical polymer blends absent the polyethylene compatible nucleator.

The nucleated material may be obtained by the introduction of a nucleating agent into the multimodal blend by any desired means. The nucleating agent may also be introduced at any point in the production of the multimodal blend. In an embodiment, the nucleating agent may be introduced at any point in the production of the first and/or second component. In an alternative embodiment, the nucleating agent is introduced with the monomer feed of the first composition prior to polymerization of the first component. In another embodiment, the nucleating agent is introduced during the first component polymerization. In yet another embodiment, the nucleating agent is combined with the first component at any point following the polymerization of the first component.

In an embodiment, the nucleating agent is combined with the first component at any point following the polymerization of the first component but prior to the addition of the second component with the first component. In an embodiment, the nucleating agent is combined with the first component via melt mixing of the nucleating agent with the first component in a molten, or liquid, state. In another embodiment, the nucleating agent is combined with the first component via the use of a masterbatch, wherein the term "masterbatch" refers to the process of first melt mixing the nucleator agent with a small amount of first component resin resulting in a masterbatch, followed by mixing the masterbatch with the remaining bulk of the first component resin. In a further embodiment, via physical blending of the nucleating agent with the first component in a solid, or solid-like, state.

In an embodiment, the nucleation may be performed by the methods described in U.S. Pat. Nos. 6,599,971, 6,794,433, and 7,332,536, each to Dotson et al. and incorporated by reference herein in their entirety. In an embodiment, the nucleation may be performed by the methods described in U.S. Patent Application Nos. 20060047078 to Swabey et al. and 20080118749 and 20090029182, to Aubee et al., and incorporated by reference herein in their entirety.

The nucleating agents may include any additive that presents a new surface on which crystal growth can occur. The nucleating agents may be inorganic or organic. The inorganic nucleating agents may include small particulates such as talc and calcium carbonate. The nucleating agents may be selected from any polyethylene compatible nucleator known in the art. The polyethylene compatible nucleators maybe selected from the group of carboxylic acid salts, such as sodium benzoate, talc, phosphates, metallic-silicate hydrates, organic derivatives of dibenzylidene sorbitol, sorbitol acetals, and organophosphate salts, and combinations thereof. In an embodiment, the nucleating agents include Na-11 (Sodium 2,2-methylene-bis-(4,6-di tert butylphenyl)phosphate) and Na-21 (primary component-Aluminum, hydroxybis[2,4,8,10-tetrakis(1,1-dimethylethyl)-6-hydroxy-12H-dibenzoi[d,g][1,3,2]dioxaphoshocin 6-oxidato]), both commercially available from Amfine Chemical. In an optional embodiment, the nucleating agents include Hyperform® HPN-68L (80% Bicyclo[2,2,1]Heptane-2,3-dicarboxylic acid, disodium salt+10% 13-Docosenamide (Z)+10% Amorphous Silicon Dioxide), HPN-20E (34% Zinc Stearate+66% 1,2-Cyclohexanedicarboxylic Acid, Calcium salt), Millad 3988 (3,4-dimethylebenzylidene sorbitol), and Millad 3940 ((1,3:2,4) Diparamethyldibenylidene sorbitol), each commercially available from Milliken and Company. In a specific embodiment, the nucleating agent includes Hyperform HPN-20E. In another embodiment, the nucleating agents include HHPA salts (salts of dicarboxylic acids having a hexahydrophtalic acid structure).

The nucleating agents may be present in the multimodal blend in any effective amounts. In an embodiment, the nucleating agents are present only in the first component. In an embodiment, the nucleating agents present in the first component are present in amounts of at least 1 ppm by weight of the first component. In another embodiment, the nucleating agents present in the first component are present in amounts ranging from 1 to 10,000 ppm by weight of the first component. In a further embodiment, the nucleating agents present in the first component are present in amounts ranging from 50 to 3,000 ppm. In an even further embodiment, the nucleating agents present in the first component are present in amounts ranging from 100 to 1,000 ppm.

The multimodal blend of the present disclosure may contain any suitable amounts of the first and/or second component. In an embodiment, the first component is present in the multimodal blend in amounts of at least 50 wt % based on the total weight of the blend. In another embodiment, the first component is present in the multimodal blend in amounts ranging from 60 to 99 wt % based on the total weight of the blend. In a further embodiment, the first component is present in the multimodal blend in amounts ranging from 70 to 95 wt %. In an even further embodiment, the first component is present in the multimodal blend in amounts ranging from 75 to 85 wt %.

In an embodiment, the second component is present in the multimodal blend in amounts of at least 0.1 wt % based on the total weight of the blend. In another embodiment, the first component is present in the multimodal blend in amounts ranging from 1 to 40 wt % based on the total weight of the blend. In a further embodiment, the first component is present in the multimodal blend in amounts ranging from 5 to 30 wt %. In an even further embodiment, the first component is present in the multimodal blend in amounts ranging from 15 to 25 wt %.

The first and second component may be present in the multimodal blend in any desired ratio. In an embodiment, the weight ratio of the first component to the second component in the multimodal blend is from 100:1 to 1:1. In another embodiment, the weight ratio of the first component to the second component in the multimodal blend is from 50:1 to 2:1. In a further embodiment, the weight ratio of the first component to the second component in the multimodal blend is from 20:1 to 3:1. In an even further embodiment, the weight ratio of the first component to the second component in the multimodal blend is from 10:1 to 3:1.

The multimodal blend of the present disclosure may also contain other additives. In an embodiment, these additives include antioxidants, fire retardants, lubricants, blowing agents, UV stabilizers, antistatic agents, and the like. Any additive known to those of ordinary skill in the art to be useful in the preparation of polyethylene films may be used.

The multimodal blends of the present disclosure have demonstrated improvements in frost line height, and consequently bubble stability. Frost line height refers to the distance from the die face where solidification of the molten resin occurs. The maximum frost line height refers to the maximum height the blown film could tolerate before encountering problems The multimodal blends of the present disclosure may have improved moisture barrier properties. In an embodiment, at max frost line height, the films of the present disclosure have a water vapor transmission rate (WVTR) of less than 0.250 g/100 in$^2$/day, optionally less than 0.240 g/100 in$^2$/day, optionally less than 0.220 g/100 in$^2$/day, optionally less than 0.20 g/100 in$^2$/day. In another embodiment, at max frost line height, the films of the present disclosure have a WVTR of less than 0.2 g/100 in$^2$/day. In a further embodiment, at max frost line height, the films of the present disclosure have a WVTR ranging from 0.1 to 0.3 g/100 in$^2$/day.

At a low frost line height, the films of the present disclosure may have a WVTR of at least 0.1 g/100 in$^2$/day. In another embodiment, at a low frost line height, the films of the present disclosure have a WVTR of less than 0.4 g/100 in$^2$/day. In a further embodiment, at a low frost line height, the films of the present disclosure have a WVTR ranging from 0.2 to 0.3 g/100 in$^2$/day. As used herein the term "low frost line height" refers to operating having a frost line height of less than 3 die diameters in height. This is sometimes referred to in the art as "running in the pocket" or running with "no neck".

In an embodiment, the gloss 45° of the multimodal blend at max frost line height is at least 50% of the gloss 45° of the multimodal blend at a low frost line height. In another embodiment, the gloss 45° of the multimodal blend at max frost line height is at least 70% of the gloss 45° of the multimodal blend at a low frost line height. In an embodiment, the haze of the multimodal blend at a low frost line height is at least 50% of the haze of the multimodal blend at max frost line height. In an embodiment, the haze of the multimodal blend at a low frost line height is at least 70% of the haze of the multimodal blend at max frost line height. As used herein, the term "frost line height" refers to the point after the die at which phase change of the melt to the crystalline state occurs. In an embodiment, the max frost line height is at least 3 die diameters. In an embodiment, the low frost line height is from 2 to 3 die diameters.

In an embodiment, the multimodal blends of the present disclosure may be prepared by physical blending the first component and the second component. In another embodiment, the multimodal blends are prepared in-situ. In one process, a single reactor is employed with two or more distinctly different catalysts, wherein each catalyst is prepared separately on its respective support and can produce a distinct molecular weight product than the other catalyst(s). In this in-situ process, two or more distinctly different polymers are created, and the multimodal product is heterogenous.

In a second in-situ process, a single reactor is again used, however two or more different catalysts are contained on the same support. Multiple different polymers may be produced from the same catalyst particle, resulting in a polymer described as "interstitially mixed." Such an in-situ process, therefore, may achieve a much greater degree of homogeneity in the polymer product than the previously described in-situ process.

In an embodiment, the multimodal blend may be prepared in accordance with procedures disclosed in U.S. Pat. Nos. 7,396,892 and 7,473,745 to McGrath and Chandrashekar et al., respectively, each incorporated by reference herein in their entirety.

In another embodiment, the multimodal blend of the present disclosure may be prepared in at least two polymerization reactors in a series and/or parallel arrangement. In a further embodiment, the multimodal blend of the present disclosure may be prepared by polymerizing at least one mode of the multimodal blend in a first reactor followed by the polymerization of another mode in a subsequent reactor in series. In an even further embodiment, the multimodal blend of the present disclosure may be prepared by a cascade arrangement of at least two polymerization reactors in series in which each polymerization reactor is operated under different conditions resulting in a multimodal or bimodal reaction product. The polymerization reactors may be plug flow reactors, continuous stirred tank reactors (CSTR), or any combinations thereof.

The polymers and blends thereof of the present disclosure may be useful in applications known to one skilled in the art, including forming operations (e g, film, sheet, pipe and fiber extrusion and co-extrusion as well as blow molding, injection molding and rotary molding). Films include blown, oriented, or cast films formed by extrusion, co-extrusion, or by lamination. Useful films are those such as shrink films, cling films, stretch films, sealing films, heavy-duty bags, grocery sacks, food packaging, medical packaging, commercial packaging, industrial liners, and membranes. Fibers include slit-films, monofilaments, melt spinning, solution spinning and melt blown fiber. Useful fibers are those such as woven or non-woven fibers that may be used to make sacks, bags, rope, twine, carpet backing, carpet yarns, filters, diaper fabrics, medical garments and geotextiles. Extruded articles include medical tubing, wire and cable coatings, and sheets, such as thermoformed sheets (e.g., plastic corrugated cardboard), geomembranes and pond liners. Molded articles include single and multi-layered constructions in the form of bottles, tanks, drums, large hollow articles, rigid food containers and toys.

In an embodiment, the polymers and blends thereof are used to form films. In another embodiment, the polymers and blends thereof are used to form blown films.

EXAMPLES

As used herein, Polymer "A" is Total 6420, which is commercially available from Total Petrochemicals USA, Inc. and is a HDPE having a density of 0.962 g/cm$^3$ and an MFI of 2.0 g/10 min.

As used herein, Polymer "B" is Total 9458, which is commercially available from Total Petrochemicals USA, Inc. and is a bimodal HDPE having a density of 0.958 g/cm$^3$ and an MFI of 0.45 g/10 min.

As used herein, Polymer "C" is a nucleated version of Total 6420, which is commercially available from Total Petrochemicals USA, Inc. and is a HDPE having a density of 0.962 g/cm$^3$ and an MFI of 2.0 g/10 min that has been subjected to a nucleating agent Hyperform® HPN-20E in amount of 1500 ppm per weight of 6420.

Example 1

Figure 3:
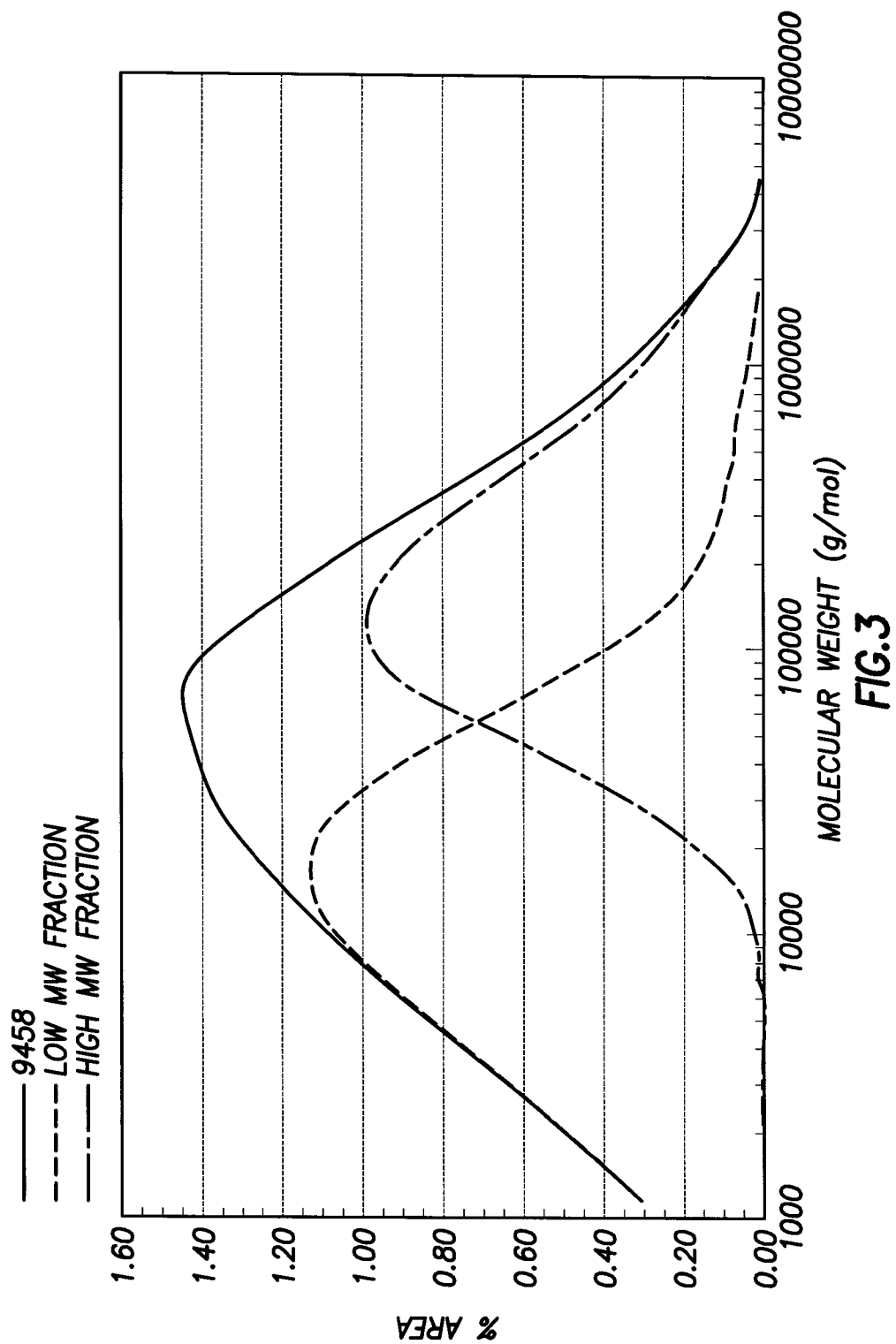
FIG. 3 is a graph of molecular weight distribution of a bimodal polyethylene.
Figure 4:
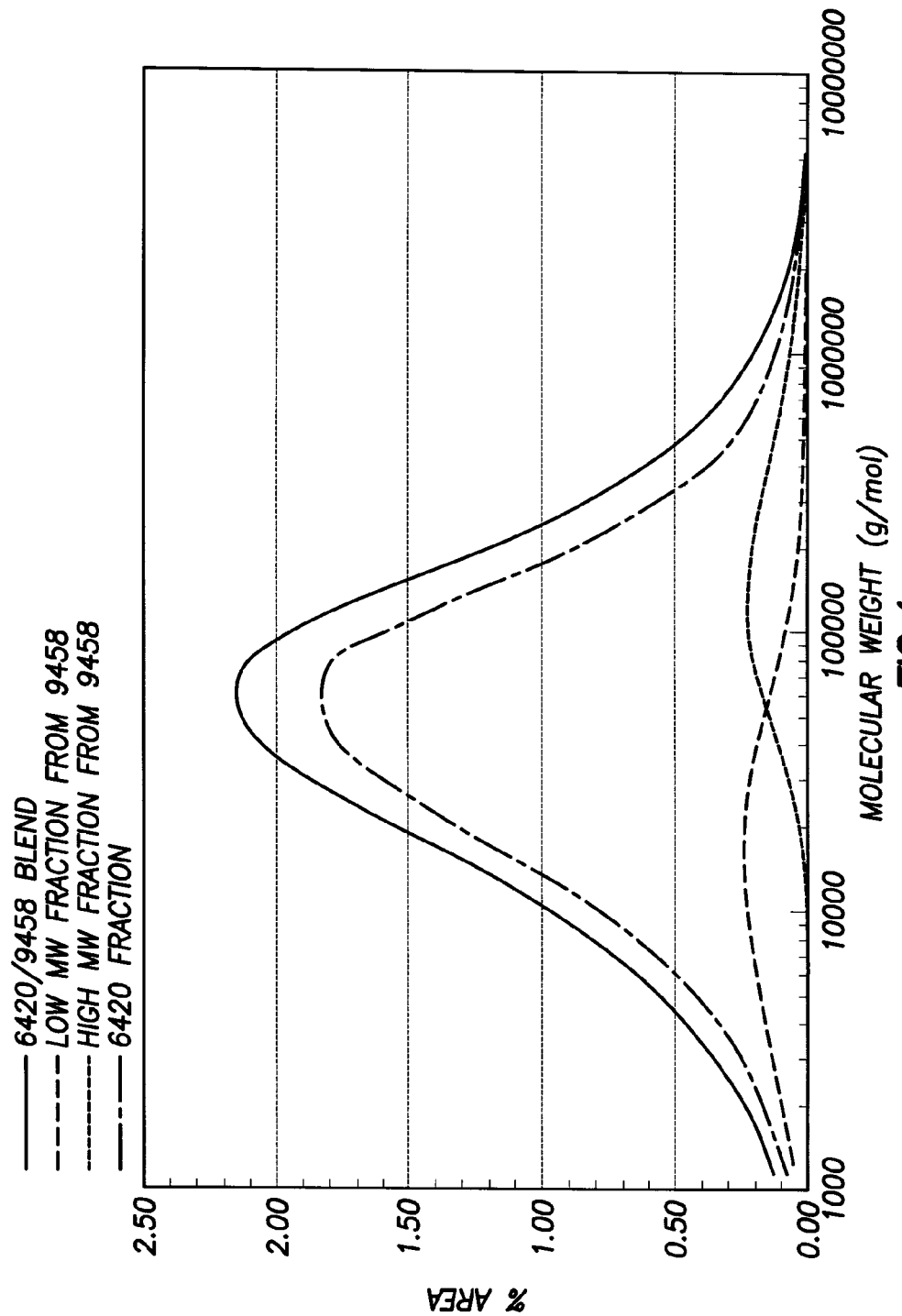
FIG. 4 is a graph molecular weight distribution molecular weight distribution of a trimodal polyethylene blend.

A multimodal composition was obtained through physical blending a first polyethylene component and a second polyethylene component. Total 6420, or Polymer "A", commercially available from Total Petrochemicals USA, Inc., was used as the first component or unimodal portion and Total 9458, or Polymer "B", commercially available from Total Petrochemicals USA, Inc., was used as the second component or bimodal portion, and as combined they created a trimodal melt blend. The nucleated version of 6420 may be referred to herein as Polymer "C". The gel permeation chromatography of each polyethylene component is depicted in FIG. 1. Although polymer B may appear to have a single broad MWD in FIG. 1, it is a bimodal PE product wherein the overlap of the two modes results in a combined MWD as shown, the two modes and the combined mode is shown in FIG. 3. The results of this experiment show that the combination of the first and second component created synergistic results in the blend superior to using either component alone or separately. The modes of the combination of the first and second component are shown in FIG. 4 and in table form in Table 2.

The processing benefits of using the blend are demonstrated in the unnucleated blends. As the amount of "B" added to "A" was increased from 0 to 20 wt %, the ability to increase frostline height rose. Adding bimodal HDPE, 9458 ("B"), to "A" also incrementally lowers motor amperes. The processing data for these results are shown in Table 1.

TABLE 1

Processing Data

| Material | Maximum Frost Line Height (Die Diameters) | Extruder Amps | Melt Pressure (psi) |
|---|---|---|---|
| A | 13 | 51 | 2812 |
| 95%-A/5%-B | 17 | 51 | 2793 |
| 90%-A/10%-B | 20 | 50 | 2820 |
| 80%-A/20%-B | 23 | 49 | 2912 |
| C | | 51 | 2727 |
| 95%-C/5%-B | | 47 | 2692 |
| 90%-C/10%-B | | 47 | 2698 |
| 80%-C/20%-B | | 48 | 2814 |

TABLE 2

Molecular Weight Distribution of Trimodal Blend

| 6420/9458 (80/20%) | | Low MW Fraction | | High MW Fraction | | 6420 Fraction | | Reconstituted | |
|---|---|---|---|---|---|---|---|---|---|
| % Area | MW | % Area | MW | % Area | MW | % Area | MW | % Area | MW |
| 0.006 | 5,226,722 | 0.003 | 1,870,417 | 0.002 | 4,322,458 | 0.026 | 3,076,641 | 0.002 | 4,322,458 |
| 0.010 | 4,793,071 | 0.003 | 1,723,869 | 0.003 | 3,967,693 | 0.028 | 2,828,914 | 0.003 | 3,967,693 |
| 0.013 | 4,397,361 | 0.003 | 1,589,392 | 0.005 | 3,643,622 | 0.033 | 2,602,196 | 0.005 | 3,643,622 |
| 0.015 | 4,036,096 | 0.004 | 1,465,940 | 0.007 | 3,347,448 | 0.038 | 2,394,609 | 0.007 | 3,347,448 |
| 0.017 | 3,706,119 | 0.005 | 1,352,561 | 0.010 | 3,076,641 | 0.043 | 2,204,454 | 0.036 | 3,076,641 |
| 0.020 | 3,404,576 | 0.006 | 1,248,392 | 0.013 | 2,828,914 | 0.050 | 2,030,189 | 0.042 | 2,828,914 |
| 0.025 | 3,128,886 | 0.007 | 1,152,643 | 0.017 | 2,602,196 | 0.060 | 1,870,417 | 0.050 | 2,602,196 |
| 0.031 | 2,876,716 | 0.008 | 1,064,601 | 0.021 | 2,394,609 | 0.069 | 1,723,869 | 0.059 | 2,394,609 |
| 0.038 | 2,645,951 | 0.009 | 983,611 | 0.026 | 2,204,454 | 0.079 | 1,589,392 | 0.069 | 2,204,454 |
| 0.047 | 2,434,680 | 0.009 | 909,080 | 0.030 | 2,030,189 | 0.089 | 1,465,940 | 0.081 | 2,030,189 |
| 0.056 | 2,241,166 | 0.010 | 840,467 | 0.034 | 1,870,417 | 0.099 | 1,352,561 | 0.097 | 1,870,417 |
| 0.067 | 2,063,840 | 0.011 | 777,278 | 0.037 | 1,723,869 | 0.108 | 1,248,392 | 0.109 | 1,723,869 |
| 0.080 | 1,901,275 | 0.012 | 719,061 | 0.042 | 1,589,392 | 0.116 | 1,152,643 | 0.124 | 1,589,392 |
| 0.095 | 1,752,178 | 0.013 | 665,406 | 0.046 | 1,465,940 | 0.124 | 1,064,601 | 0.139 | 1,465,940 |
| 0.112 | 1,615,373 | 0.014 | 615,937 | 0.050 | 1,352,561 | 0.132 | 983,611 | 0.154 | 1,352,561 |
| 0.128 | 1,489,795 | 0.015 | 570,312 | 0.053 | 1,248,392 | 0.141 | 909,080 | 0.168 | 1,248,392 |
| 0.145 | 1,374,474 | 0.016 | 528,216 | 0.058 | 1,152,643 | 0.151 | 840,467 | 0.181 | 1,152,643 |

TABLE 2-continued

Molecular Weight Distribution of Trimodal Blend

| 6420/9458 (80/20%) | | Low MW Fraction | | High MW Fraction | | 6420 Fraction | | Reconstituted | |
|---|---|---|---|---|---|---|---|---|---|
| % Area | MW | % Area | MW | % Area | MW | % Area | MW | % Area | MW |
| 0.162 | 1,268,528 | 0.016 | 489,364 | 0.063 | 1,064,601 | 0.163 | 777,278 | 0.195 | 1,064,601 |
| 0.179 | 1,171,155 | 0.016 | 453,492 | 0.068 | 983,611 | 0.176 | 719,061 | 0.209 | 983,611 |
| 0.197 | 1,081,625 | 0.017 | 420,362 | 0.074 | 909,080 | 0.192 | 665,406 | 0.224 | 909,080 |
| 0.215 | 999,274 | 0.019 | 389,753 | 0.079 | 840,467 | 0.211 | 615,937 | 0.240 | 840,467 |
| 0.234 | 923,497 | 0.020 | 361,465 | 0.084 | 777,278 | 0.231 | 570,312 | 0.259 | 777,278 |
| 0.254 | 853,741 | 0.021 | 335,312 | 0.090 | 719,061 | 0.254 | 528,216 | 0.278 | 719,061 |
| 0.277 | 789,504 | 0.021 | 311,127 | 0.096 | 665,406 | 0.279 | 489,364 | 0.301 | 665,406 |
| 0.301 | 730,327 | 0.023 | 288,754 | 0.103 | 615,937 | 0.308 | 453,492 | 0.327 | 615,937 |
| 0.327 | 675,790 | 0.025 | 268,051 | 0.109 | 570,312 | 0.341 | 420,362 | 0.355 | 570,312 |
| 0.356 | 625,513 | 0.027 | 248,887 | 0.116 | 528,216 | 0.377 | 389,753 | 0.385 | 528,216 |
| 0.387 | 579,145 | 0.029 | 231,144 | 0.123 | 489,364 | 0.416 | 361,465 | 0.418 | 489,364 |
| 0.421 | 536,367 | 0.031 | 214,710 | 0.131 | 453,492 | 0.459 | 335,312 | 0.455 | 453,492 |
| 0.459 | 496,888 | 0.034 | 199,486 | 0.138 | 420,362 | 0.505 | 311,127 | 0.496 | 420,362 |
| 0.500 | 460,440 | 0.037 | 185,378 | 0.144 | 389,753 | 0.555 | 288,754 | 0.540 | 389,753 |
| 0.543 | 426,780 | 0.040 | 172,300 | 0.151 | 361,465 | 0.609 | 268,051 | 0.588 | 361,465 |
| 0.588 | 395,683 | 0.044 | 160,175 | 0.159 | 335,312 | 0.667 | 248,887 | 0.639 | 335,312 |
| 0.638 | 366,946 | 0.049 | 148,929 | 0.168 | 311,127 | 0.729 | 231,144 | 0.694 | 311,127 |
| 0.693 | 340,380 | 0.054 | 138,497 | 0.174 | 288,754 | 0.793 | 214,710 | 0.752 | 288,754 |
| 0.750 | 315,814 | 0.060 | 128,818 | 0.180 | 268,051 | 0.860 | 199,486 | 0.815 | 268,051 |
| 0.810 | 293,090 | 0.066 | 119,834 | 0.187 | 248,887 | 0.929 | 185,378 | 0.881 | 248,887 |
| 0.874 | 272,064 | 0.073 | 111,493 | 0.193 | 231,144 | 0.999 | 172,300 | 0.951 | 231,144 |
| 0.942 | 252,603 | 0.079 | 103,749 | 0.199 | 214,710 | 1.072 | 160,175 | 1.023 | 214,710 |
| 1.009 | 234,584 | 0.087 | 96,556 | 0.203 | 199,486 | 1.147 | 148,929 | 1.097 | 199,486 |
| 1.079 | 217,897 | 0.095 | 89,874 | 0.208 | 185,378 | 1.224 | 138,497 | 1.173 | 185,378 |
| 1.153 | 202,439 | 0.103 | 83,666 | 0.211 | 172,300 | 1.302 | 128,818 | 1.251 | 172,300 |
| 1.232 | 188,114 | 0.111 | 77,895 | 0.215 | 160,175 | 1.379 | 119,834 | 1.331 | 160,175 |
| 1.311 | 174,837 | 0.120 | 72,532 | 0.217 | 148,929 | 1.454 | 111,493 | 1.413 | 148,929 |
| 1.390 | 162,527 | 0.128 | 67,545 | 0.219 | 138,497 | 1.526 | 103,749 | 1.498 | 138,497 |
| 1.469 | 151,111 | 0.137 | 62,907 | 0.220 | 128,818 | 1.594 | 96,556 | 1.582 | 128,818 |
| 1.550 | 140,522 | 0.145 | 58,594 | 0.220 | 119,834 | 1.656 | 89,874 | 1.665 | 119,834 |
| 1.632 | 130,696 | 0.154 | 54,582 | 0.220 | 111,493 | 1.711 | 83,666 | 1.746 | 111,493 |
| 1.713 | 121,577 | 0.162 | 50,848 | 0.219 | 103,749 | 1.757 | 77,895 | 1.824 | 103,749 |
| 1.791 | 113,112 | 0.171 | 47,374 | 0.218 | 96,556 | 1.791 | 72,532 | 1.898 | 96,556 |
| 1.867 | 105,252 | 0.180 | 44,140 | 0.214 | 89,874 | 1.815 | 67,545 | 1.965 | 89,874 |
| 1.933 | 97,953 | 0.188 | 41,130 | 0.209 | 83,666 | 1.830 | 62,907 | 2.023 | 83,666 |
| 1.992 | 91,172 | 0.195 | 38,328 | 0.204 | 77,895 | 1.836 | 58,594 | 2.072 | 77,895 |
| 2.045 | 84,871 | 0.202 | 35,718 | 0.197 | 72,532 | 1.834 | 54,582 | 2.108 | 72,532 |
| 2.089 | 79,016 | 0.208 | 33,288 | 0.189 | 67,545 | 1.827 | 50,848 | 2.132 | 67,545 |
| 2.119 | 73,573 | 0.215 | 31,025 | 0.179 | 62,907 | 1.817 | 47,374 | 2.146 | 62,907 |
| 2.137 | 68,513 | 0.220 | 28,916 | 0.170 | 58,594 | 1.802 | 44,140 | 2.150 | 58,594 |
| 2.146 | 63,808 | 0.225 | 26,952 | 0.159 | 54,582 | 1.781 | 41,130 | 2.146 | 54,582 |
| 2.149 | 59,432 | 0.230 | 25,121 | 0.149 | 50,848 | 1.756 | 38,328 | 2.138 | 50,848 |
| 2.147 | 55,361 | 0.234 | 23,416 | 0.138 | 47,374 | 1.726 | 35,718 | 2.126 | 47,374 |
| 2.141 | 51,574 | 0.237 | 21,826 | 0.128 | 44,140 | 1.690 | 33,288 | 2.109 | 44,140 |
| 2.129 | 48,049 | 0.239 | 20,344 | 0.118 | 41,130 | 1.650 | 31,025 | 2.087 | 41,130 |
| 2.112 | 44,769 | 0.240 | 18,963 | 0.109 | 38,328 | 1.606 | 28,916 | 2.060 | 38,328 |
| 2.088 | 41,715 | 0.240 | 17,676 | 0.101 | 35,718 | 1.560 | 26,952 | 2.028 | 35,718 |
| 2.059 | 38,873 | 0.241 | 16,476 | 0.092 | 33,288 | 1.510 | 25,121 | 1.991 | 33,288 |
| 2.023 | 36,226 | 0.241 | 15,357 | 0.083 | 31,025 | 1.458 | 23,416 | 1.948 | 31,025 |
| 1.981 | 33,760 | 0.240 | 14,313 | 0.075 | 28,916 | 1.404 | 21,826 | 1.901 | 28,916 |
| 1.931 | 31,465 | 0.239 | 13,341 | 0.066 | 26,952 | 1.349 | 20,344 | 1.852 | 26,952 |
| 1.878 | 29,326 | 0.236 | 12,433 | 0.059 | 25,121 | 1.293 | 18,963 | 1.799 | 25,121 |
| 1.823 | 27,333 | 0.233 | 11,587 | 0.052 | 23,416 | 1.237 | 17,676 | 1.744 | 23,416 |
| 1.767 | 25,477 | 0.230 | 10,798 | 0.045 | 21,826 | 1.181 | 16,476 | 1.686 | 21,826 |
| 1.710 | 23,747 | 0.227 | 10,062 | 0.039 | 20,344 | 1.124 | 15,357 | 1.627 | 20,344 |
| 1.651 | 22,135 | 0.223 | 9,376 | 0.034 | 18,963 | 1.068 | 14,313 | 1.567 | 18,963 |
| 1.591 | 20,632 | 0.219 | 8,736 | 0.029 | 17,676 | 1.014 | 13,341 | 1.506 | 17,676 |
| 1.530 | 19,232 | 0.214 | 8,139 | 0.024 | 16,476 | 0.962 | 12,433 | 1.445 | 16,476 |
| 1.471 | 17,926 | 0.208 | 7,582 | 0.019 | 15,357 | 0.912 | 11,587 | 1.384 | 15,357 |
| 1.409 | 16,709 | 0.203 | 7,063 | 0.015 | 14,313 | 0.863 | 10,798 | 1.324 | 14,313 |
| 1.347 | 15,574 | 0.198 | 6,579 | 0.012 | 13,341 | 0.815 | 10,062 | 1.265 | 13,341 |
| 1.284 | 14,516 | 0.192 | 6,127 | 0.010 | 12,433 | 0.769 | 9,376 | 1.208 | 12,433 |
| 1.225 | 13,530 | 0.186 | 5,705 | 0.008 | 11,587 | 0.725 | 8,736 | 1.153 | 11,587 |
| 1.167 | 12,610 | 0.180 | 5,312 | 0.006 | 10,798 | 0.681 | 8,139 | 1.100 | 10,798 |
| 1.109 | 11,752 | 0.174 | 4,946 | 0.005 | 10,062 | 0.639 | 7,582 | 1.046 | 10,062 |
| 1.054 | 10,952 | 0.168 | 4,604 | 0.003 | 9,376 | 0.601 | 7,063 | 0.995 | 9,376 |
| 1.002 | 10,206 | 0.162 | 4,286 | 0.003 | 8,736 | 0.564 | 6,579 | 0.946 | 8,736 |
| 0.951 | 9,510 | 0.155 | 3,988 | 0.002 | 8,139 | 0.529 | 6,127 | 0.898 | 8,139 |
| 0.902 | 8,861 | 0.149 | 3,711 | 0.003 | 7,582 | 0.495 | 5,705 | 0.850 | 7,582 |
| 0.855 | 8,255 | 0.142 | 3,453 | 0.003 | 7,063 | 0.464 | 5,312 | 0.806 | 7,063 |
| 0.811 | 7,691 | 0.136 | 3,212 | 0.002 | 6,579 | 0.434 | 4,946 | 0.764 | 6,579 |
| 0.768 | 7,164 | 0.129 | 2,987 | | | 0.406 | 4,604 | 0.721 | 6,127 |
| 0.724 | 6,673 | 0.123 | 2,778 | | | 0.379 | 4,286 | 0.682 | 5,705 |

TABLE 2-continued

Molecular Weight Distribution of Trimodal Blend

| 6420/9458 (80/20%) | | Low MW Fraction | | High MW Fraction | | 6420 Fraction | | Reconstituted | |
|---|---|---|---|---|---|---|---|---|---|
| % Area | MW | % Area | MW | % Area | MW | % Area | MW | % Area | MW |
| 0.681 | 6,215 | 0.117 | 2,583 | | | 0.353 | 3,988 | 0.644 | 5,312 |
| 0.641 | 5,787 | 0.111 | 2,401 | | | 0.329 | 3,711 | 0.609 | 4,946 |
| 0.604 | 5,389 | 0.105 | 2,232 | | | 0.306 | 3,453 | 0.574 | 4,604 |
| 0.569 | 5,017 | 0.098 | 2,074 | | | 0.285 | 3,212 | 0.540 | 4,286 |
| 0.536 | 4,671 | 0.092 | 1,927 | | | 0.265 | 2,987 | 0.508 | 3,988 |
| 0.503 | 4,347 | 0.086 | 1,790 | | | 0.246 | 2,778 | 0.478 | 3,711 |
| 0.472 | 4,046 | 0.081 | 1,662 | | | 0.228 | 2,583 | 0.449 | 3,453 |
| 0.442 | 3,765 | 0.076 | 1,543 | | | 0.211 | 2,401 | 0.421 | 3,212 |
| 0.416 | 3,503 | 0.070 | 1,432 | | | 0.195 | 2,232 | 0.394 | 2,987 |
| 0.391 | 3,259 | 0.064 | 1,329 | | | 0.181 | 2,074 | 0.369 | 2,778 |
| 0.365 | 3,031 | 0.059 | 1,233 | | | 0.168 | 1,927 | 0.345 | 2,583 |
| 0.339 | 2,819 | | | | | 0.156 | 1,790 | 0.321 | 2,401 |
| 0.315 | 2,621 | | | | | 0.142 | 1,662 | 0.300 | 2,232 |
| 0.293 | 2,436 | | | | | 0.128 | 1,543 | 0.279 | 2,074 |
| 0.271 | 2,265 | | | | | 0.114 | 1,432 | 0.260 | 1,927 |
| 0.251 | 2,104 | | | | | 0.101 | 1,329 | 0.243 | 1,790 |
| 0.232 | 1,955 | | | | | 0.089 | 1,233 | 0.223 | 1,662 |
| 0.214 | 1,816 | | | | | 0.079 | 1,144 | 0.204 | 1,543 |
| 0.198 | 1,687 | | | | | | | 0.184 | 1,432 |
| 0.182 | 1,566 | | | | | | | 0.166 | 1,329 |
| 0.169 | 1,454 | | | | | | | 0.148 | 1,233 |
| 0.156 | 1,349 | | | | | | | | |
| 0.143 | 1,252 | | | | | | | | |
| 0.129 | 1,161 | | | | | | | | |

Example 2

Figure 2:
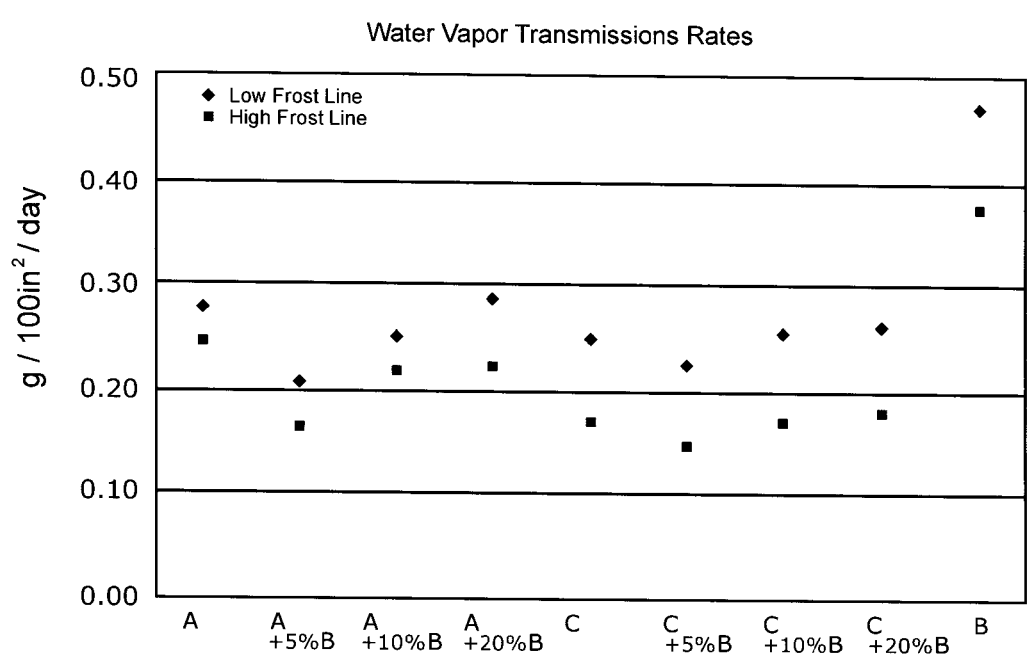
FIG. 2 is a graph of the water vapor transmission rates for several multimodal blend samples.

Films with a thickness of 2 mil were produced at two different frost line heights from the polymers and blends of Example 1. The minimum frost line height (FLH) was held constant at 5.5" (2.30 die diameters). The maximum frost line height was varied according to what the blown film could tolerate before encountering instability or other processing problems. These 2 mil films were then tested for barrier properties, as listed in Table 3 and shown in FIG. 2.

TABLE 3

Barrier Properties of the Materials Tested

| | 2 mil film WVTR (g/100 in²/day) | | normalized WVTR (g/100 in²/day) | |
|---|---|---|---|---|
| Material | @ Max. FLH | @ Low FLH | @ Max. FLH | @ Low FLH |
| A | 0.122 | 0.138 | 0.244 | 0.276 |
| B | 0.188 | 0.235 | 0.376 | 0.470 |
| 95%-A/5%-B | 0.077 | 0.103 | 0.154 | 0.206 |
| 90%-A/10%-B | 0.109 | 0.125 | 0.218 | 0.250 |
| 80%-A/20%-B | 0.112 | 0.146 | 0.224 | 0.292 |
| C | 0.088 | 0.127 | 0.176 | 0.254 |
| 95%-C/5%-B | 0.073 | 0.113 | 0.146 | 0.226 |
| 90%-C/10%-B | 0.085 | 0.128 | 0.170 | 0.156 |
| 80%-C/20%-B | 0.091 | 0.130 | 0.182 | 0.260 |

Without nucleation, adding 20 wt % of polymer B to polymer A produced a film with increased permeability. With nucleation, permeability decreases at both the low and maximum frost line heights. Therefore nucleation is successful in a multimodal HDPE blend at reducing permeability, which creates a novel result. At low FLH, the nucleated blend matches the permeability of polymer A. At maximum FLH, the nucleated blend provides the lowest permeability of all films studied. At both low and high frost line heights, adding 5% of polymer B to polymer A provided more improvement in barrier than does nucleation alone, which also is a novel result.

Nucleation also benefits the film optical properties when FLH is maximized. Both polymer A and the unnucleated blend of polymer B and polymer A have considerably more haze and less gloss than the nucleated blend of polymer C and polymer B as shown in Table 4.

TABLE 4

Optical Properties

| | Outside Gloss (45°) | | Haze (%) | |
|---|---|---|---|---|
| Material | @ Low FLH | @ Max. FLH | @ Low FLH | @ Max. FLH |
| A | 25.6 | 13.6 | 32.7 | 53.6 |
| 95%-A/5%-B | 24.3 | 13.5 | 38.6 | 55.2 |
| 90%-A/10%-B | 23.9 | 14.8 | 36.0 | 51.9 |
| 80%-A/20%-B | 25.9 | 10.8 | 34.3 | 56.8 |
| C | 30.6 | 24.4 | 27.6 | 32.8 |
| 95%-C/5%-B | 30.2 | 23.6 | 29.2 | 33.0 |
| 90%-C/10%-B | 28.8 | 25.3 | 29.7 | 32.3 |
| 80%-C/20%-B | 26.8 | 19.1 | 31.7 | 39.9 |

In addition, as shown in Table 5, the use of the nucleator reduces tear properties in both the machine direction (MD) and the transverse direction (TD). The addition of 20 wt % of polymer B, however, compensates for this loss in tear resistance with the nucleated blends matching the results of the polymer A sample.

TABLE 5

Tear Properties of the Sample Films

| Material | MD Tear | | TD Tear | |
|---|---|---|---|---|
| | @ Low FLH | @ Max. FLH | @ Low FLH | @ Max. FLH |
| A | 51.1 | 48.4 | 97.2 | 88.0 |
| 80%-A/20%-B | 44.7 | 71.7 | 99.2 | 74.4 |
| C | 36.0 | 37.2 | 57.6 | 46.4 |
| 80%-C/20%-B | 41.4 | 45.2 | 104.4 | 84.8 |

The results of these experiments show that a polyethylene nucleator is effective in a multimodal blend. The nucleated multimodal blends showed significant improvement in barrier properties over the unnucleated versions, especially at higher frost line conditions. The nucleated multimodal blends also showed lower haze and higher gloss than the unnucleated blends when the frost line height is maximized. The blend of polymer A with 5 wt % of polymer B provided significant improvement in barrier properties. According to FIG. 2, at both low and high frost line heights, adding 5 wt % of polymer B to polymer A provided more improvement in barrier than by nucleation alone.

Example 3

Typically HDPE high barrier films (e.g., cereal liners) are composed of at least three layers of coex blown films with an A/B/C structure (a usual layer distribution could be 45/45/10 or 40/40/20), where the A layer (outer layer) is a high barrier HDPE, the B layer (core layer) could be a "lower cost" HDPE and the C layer (inside layer) is the sealing layer (usually EVA, LDPE or other special copolymers for pealability). Overall these films can have very good barrier properties and high stiffness; however, low tear strength and the relatively high cost (due to higher cost high barrier HDPE) are typical challenges.

In general, running a high-stalk film can help on the tear strength and barrier (higher frost line height) sides; however, typical structures cannot be run in high-stalk mode. Even if a standard HMW-HDPE is used in the core layer, the overall structure may not be stable enough to be run in high stalk mode in commercial lines/rates. Additionally, the WVTR of standard HMW-HDPE is relatively high and therefore is usually not considered an option for these applications. Nucleated polymers of the present disclosure may address these challenges by improving bubble stability, enabling the running at a higher frost line height, as well as improved barrier properties of the HMW-HDPE.

TABLE 6

| Grade | Target MI2 [g/10 min] | Target Density [g/cc] | Comments |
|---|---|---|---|
| BDM1 10-03 | 2 | 0.958 | Developmental HDPE high barrier grade |
| HL535 | 0.35 | 0.955 | Broad MWD HDPE |
| M2710EP | 0.9 | 0.927 | Metallocene MDPE |
| 2285 | 0.08 | 0.950 | Standard HMW-HDPE |
| N11031 | 0.08 | 0.950 | HMW-HDPE for ultra-thin films (2285 + 1,500 ppm HPN-20E nucleator) |

Blown film samples comparing a typical MMW-HDPE structure, a film based on a standard HMW-HDPE and a film using the ultra-thin HMW (N11031) were produced on a Davis Standard mini-coex line. Table 7 shows details of the structures evaluated.

TABLE 7

| ID | Structure |
|---|---|
| MMW | A/B/C (40/40/20) |
| | A = BDM1 10-03, B = HL535, C = M2710EP |
| | 2 mil, 2.5:1 BUR |
| HMW | A/B/C (40/40/20) |
| | A = BDM1 10-03, B = 2285, C = M2710EP |
| | 2 mil, ~4:1 BUR, high stalk |
| Ultra-thin HMW | A/B/C (40/40/20) |
| | A = BDM1 10-03, B = N11031, C = M2710EP |
| | 2 mil, ~4:1 BUR, high stalk |

WVTR, falling dart impact resistance, tear strength and secant modulus properties were evaluated for all the films.

Figure 5:
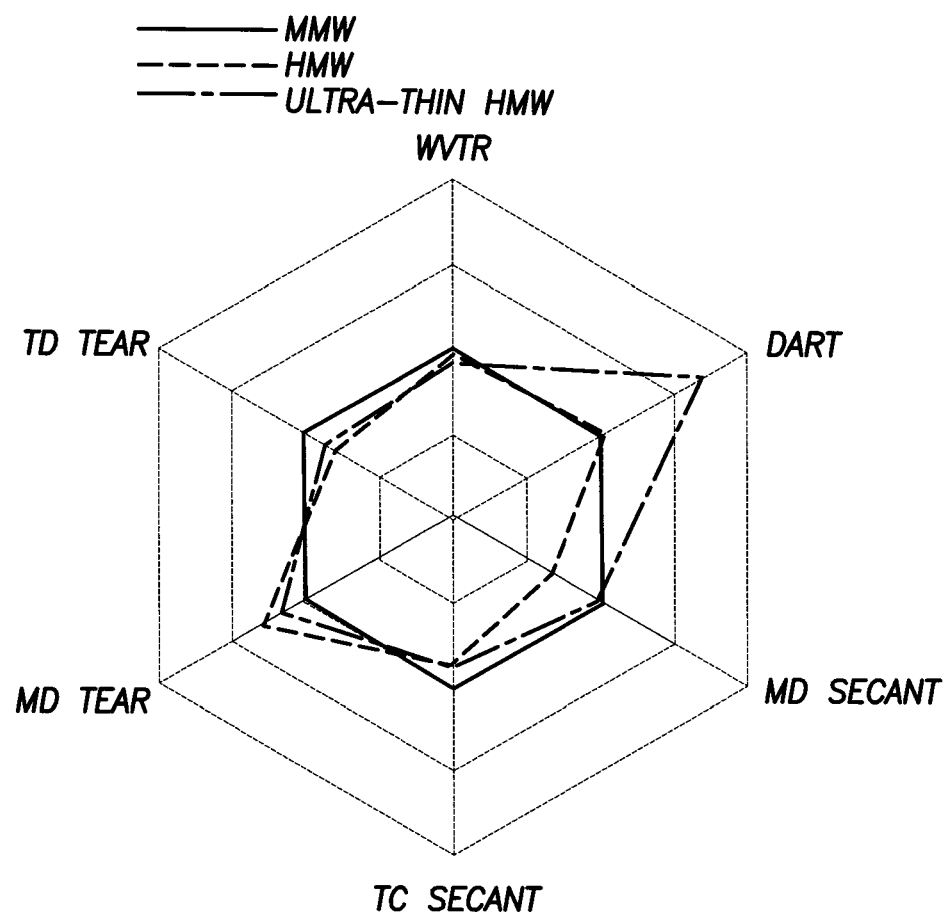
FIG. 5 is a web graph of properties for several multimodal blend samples.

Table 8 shows the WVTR, stiffness (secant modulus), impact (dart) and tear strength testing results. FIG. 5 presents a relative comparison of the three films under study. In general, the HMW structures compare well with the typical MMW film WVTR is at least equivalent or even slightly better for the ultra-thin HMW based film. Also, the dart strength for the ultra-thin HMW based film is significantly higher. Moreover, as expected, the HMW films show an increase in MD tear strength. On the stiffness side, the secant modulus of the film using the ultra-thin HMW-HDPE is comparable to the MMW film suggesting that filling/conversion should be similar

TABLE 8

| | MMW | HMW | Ultra-thin HMW |
|---|---|---|---|
| Normalized WVTR [g/100 in$^2$/day/mil] | 0.42 | 0.41 | 0.39 |
| Dart [g] | 56.9 | 60.0 | 98.2 |
| 1% Secant Modulus, MD [psi] | 111,599 | 76,225 | 111,466 |
| 1% Secant Modulus, TD [psi] | 151,681 | 134,486 | 136,949 |
| MD Tear [g] | 39 | 50 | 45 |
| TD Tear [g] | 283 | 227 | 245 |

As used herein, the term "homopolymer" refers to a polymer resulting from polymerization of a single monomer species.

As used herein, the term "co-polymer," also known as a "heteropolymer," is a polymer resulting from polymerization of two or more monomer species.

As used herein, the term "unimodal" refers to one discrete molecular weight distribution.

As used herein, the term "bimodal" refers to a mixture of two discrete molecular weight distributions.

As used herein, the term "multimodal" refers to a mixture of three or more discrete molecular weight distributions.

As used herein, the term "multimodal films" refers to films having a mixture of three or more discrete molecular weight distributions.

As used herein, the term "nucleating agent" refers to an agent, or additive, that changes the crystallization behavior of a polymer as the polymer melt is cooled.

As used herein, the term "frost line height" refers to the distance from a die face to where solidification occurs, or the point beyond a die face where the temperature of the molten plastic falls below the softening point and the diameter of the extruded plastic bubble stabilizes.

As used herein the term "low frost line height" refers to operating having a frost line height of less than 3 die diameters in height. This is sometimes referred to in the art as "running in the pocket" or running with "no neck".

Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

The various embodiments of the present disclosure can be joined in combination with other embodiments of the disclosure and the listed embodiments herein are not meant to limit the disclosure. All combinations of embodiments of the disclosure are enabled, even if not given in a particular example herein.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure, and that they may make various changes, substitutions and alterations herein without departing from the spirit and scope of the present disclosure.

Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

While the foregoing is directed to embodiments, versions and examples of the present disclosure, which are included to enable a person of ordinary skill in the art to make and use the disclosures when the information in this patent is combined with available information and technology, the disclosure is not limited to only these particular embodiments, versions and examples. Also, it is within the scope of this disclosure that the aspects and embodiments disclosed herein are usable and combinable with every other embodiment and/or aspect disclosed herein, and consequently, this disclosure is enabling for any and all combinations of the embodiments and/or aspects disclosed herein. Other and further embodiments, versions and examples of the disclosure may be devised without departing from the basic scope thereof and the scope thereof is determined by the claims that follow.

What is claimed is:

1. A composition comprising:
   a first polyethylene component;
   a second bimodal or multimodal polyethylene component,
   wherein the first polyethylene component has a density ranging from 0.880 g/cm$^3$ to 0.940 g/cm$^3$, wherein the second polyethylene component has a density ranging from 0.880 g/cm$^3$ to 0.940 g/cm$^3$, or wherein the first polyethylene component and the second polyethylene component have densities ranging from 0.880 g/cm$^3$ to 0.940 g/cm$^3$; and
   a polyethylene compatible nucleating agent.

2. The composition of claim 1, wherein the first polyethylene component has a density ranging from 0.880 g/cm$^3$ to 0.940 g/cm$^3$, and wherein the second bimodal or multimodal polyethylene component is a high density polyethylene having a density ranging from 0.950 to 0.970 g/cm$^3$.

3. The composition of claim 1, wherein the second bimodal or multimodal polyethylene component has a density ranging from 0.880 g/cm$^3$ to 0.940 g/cm$^3$, and wherein the first polyethylene component is a high density polyethylene having a density ranging from 0.950 to 0.970 g/cm$^3$.

4. The composition of claim 1, wherein the first polyethylene component and the second bimodal or multimodal polyethylene component have densities ranging from 0.880 g/cm$^3$ to 0.940 g/cm$^3$.

5. The composition of claim 1, wherein the first polyethylene component is present in amounts ranging from 75 to 85 wt % based on a total weight of the composition.

6. The composition of claim 1, wherein at max frost line height, a 2 mil film of the composition comprises a water vapor transmission rate (WVTR) of less than 0.250 g/100 in$^2$/day, wherein the WVTR is measured at 100° F. in accordance with ASTM test method E96/66.

7. The composition of claim 1, wherein a two mil film of the first polyethylene component exhibits an Elmendorf Tear strength, measured using the ASTM test method D 1922, in the machine direction ranging from 10 to 50 g, and in the transverse direction ranging from 200 to 600 g.

8. The composition of claim 1, wherein a two mil film of the second polyethylene component exhibits an Elmendorf Tear strength, measured using the ASTM test method D 1922, in the machine direction ranging from 1 to 30 g, and in the transverse direction ranging from 100 to 10000 g.

9. The composition of claim 1, wherein a two mil film of the first polyethylene component exhibits a tensile strength at yield, measured using the ASTM test method D 882A at 20 in/min, ranging from 1000 to 6000 psi in the machine direction, and ranging from 1000 to 6000 psi in the transverse direction.

10. The composition of claim 1, wherein a two mil film of the first polyethylene component exhibits a tensile strength at yield, measured using the ASTM test method D 882A at 20 in/min, ranging from 1000 to 6000 psi in the machine direction, and ranging from 1000 to 4000 psi in the transvers direction.

11. The composition of claim 1, wherein a two mil film of the second polyethylene component exhibits a tensile strength at break ranging from 5000 to 10000 psi in the machine direction, and ranging from 2000 to 5000 psi in the transverse direction.

12. The composition of claim 1, wherein a two mil film of the second polyethylene component exhibits a tensile strength at break ranging from 5000 to 10000 psi in the machine direction, and ranging from 1000 to 4000 psi in the transverse direction.

13. The composition of claim 1, wherein a two mil film of the first polyethylene component exhibits an elongation at break in both the machine direction and transvers direction, measured using ASTM test method D 882A at 20 in/min, ranging from 100 to 1000%.

14. The composition of claim 1, wherein a two mil film of the second polyethylene component exhibits an elongation at break, measured using ASTM test method D 882A at 20 in/min, ranging from 100 to 500% in the machine direction, and less than 100% in the transverse direction.

15. The composition of claim 1, wherein a two mil film of the first polyethylene component exhibits a secant modulus at 1% strain, measured using ASTM test method D 882A at 20 in/min, in the machine direction ranging from 50 to 200 kpsi, and in the transvers direction ranging from 50 to 200 kpsi.

16. The composition of claim 1, wherein a two mil film of the second polyethylene component exhibits a secant modulus at 1% strain, measured using ASTM test method D 882A at 20 in/min, in the machine direction ranging from 50 to 250 kpsi, and in the transvers direction ranging from 100 to 300 kpsi.

17. The composition of claim 1, wherein a two mil film of the first polyethylene component exhibits a secant modulus at 2% strain, measured using ASTM test method D 882A at 1 in/min, in the machine direction ranging from 50 to 200 kpsi, and in the transverse direction ranging from 50 to 200 kpsi.

18. The composition of claim 1, wherein the second polyethylene component exhibits a dart impact, measured using ASTM test method D 1709A, of less than 100 g.

19. A blown film made from a composition comprising:
a first polyethylene component;
a second bimodal or multimodal polyethylene component, wherein the first polyethylene component has a density ranging from 0.880 g/cm$^3$ to 0.940 g/cm$^3$, wherein the second polyethylene component has a density ranging from 0.880 g/cm$^3$ to 0.940 g/cm$^3$, or wherein the first polyethylene component and the second polyethylene component have densities ranging from 0.880 g/cm$^3$ to 0.940 g/cm$^3$; and
a polyethylene compatible nucleating agent.

20. A method of making a composition comprising:
combining a first polyethylene component, a second bimodal or multimodal polyethylene component, and a polyethylene compatible nucleating agent, to form a multimodal resin;
wherein the first polyethylene component has a density ranging from 0.880 g/cm$^3$ to 0.940 g/cm$^3$, wherein the second polyethylene component has a density ranging from 0.880 g/cm$^3$ to 0.940 g/cm$^3$, or wherein the first polyethylene component and the second polyethylene component have densities ranging from 0.880 g/cm$^3$ to 0.940 g/cm$^3$.

21. The method of claim 20, wherein the first polyethylene component or the second polyethylene component is a high density polyethylene having a density ranging from 0.950 to 0.970 g/cm$^3$.

22. The article of claim 19, wherein the first polyethylene component or the second polyethylene component is a high density polyethylene having a density ranging from 0.950 to 0.970 g/cm$^3$.

23. The composition of claim 1, wherein the polyethylene compatible nucleating agent comprises a carboxylic acid salt, phosphate, metallic-silicate hydrate, sorbitol acetal, or combinations thereof.

24. The composition of claim 1, wherein the composition comprises from 75 to 99 weight percent of the first polyethylene component based on a total weight of the composition, wherein the first polyethylene component has a density ranging from 0.880 g/cm$^3$ to 0.940 g/cm$^3$, and wherein the second bimodal or multimodal polyethylene component has a density ranging from 0.950 to 0.970 g/cm$^3$ and a melt flow index of from 0.1 to 5.0 g/10 min. as measured in accordance with ASTM D 1238 at 190° C. and a load of 2.16 kg.

25. The composition of claim 1, wherein the second bimodal or multimodal polyethylene component comprises a polyethylene homopolymer and has a density ranging from 0.880 g/cm$^3$ to 0.940 g/cm$^3$, and wherein the first polyethylene component is a high density polyethylene having a density ranging from 0.950 to 0.970 g/cm$^3$ and a melt flow index of from 0.1 to 5.0 g/10 min. as measured in accordance with ASTM D 1238 at 190° C. and a load of 2.16 kg.

26. The composition of claim 1, wherein the composition comprises from 75 to 99 weight percent of the first polyethylene component based on a total weight of the composition, wherein the first polyethylene component has a density ranging from 0.880 g/cm$^3$ to 0.925 g/cm$^3$ and the second bimodal or multimodal polyethylene component has a density ranging from 0.880 g/cm$^3$ to 0.940 g/cm$^3$.

27. The composition of claim 1, wherein the second polyethylene component is bimodal.

* * * * *